United States Patent [19]

Gaede

[11] Patent Number: 4,828,071
[45] Date of Patent: May 9, 1989

[54] SELF-PROPELLED IMPLEMENT CARRIER

[76] Inventor: Hans-Joachim Gaede, Ackermannstrasse 18, D 7000 Stuttgart 80, Fed. Rep. of Germany

[21] Appl. No.: 833,166

[22] Filed: Feb. 27, 1986

[51] Int. Cl.⁴ .............................................. B62D 33/06
[52] U.S. Cl. .................... 180/291; 180/89.12; 180/89.13; 180/906; 172/273; 56/14.7
[58] Field of Search ...................... 280/760, 762, 769; 180/291, 292, 89.13, 89.12, 906, 54.1; 172/272, 273, 274, 275; 56/2, 14.6, 14.7, 14.8, 14.9, 15.6, DIG. 9; 414/498

[56] References Cited

U.S. PATENT DOCUMENTS

| | | | |
|---|---|---|---|
| 2,261,354 | 11/1941 | Fee | 180/89.1 |
| 2,513,942 | 7/1950 | Johnson et al. | 56/DIG. 9 |
| 2,888,088 | 5/1959 | Claas et al. | 56/14.7 |
| 3,425,194 | 2/1969 | Stott et al. | 172/273 |
| 3,811,581 | 5/1974 | Van der Lely | 214/515 |

FOREIGN PATENT DOCUMENTS 21265  5/1961  Fed. Rep. of Germany .......... 56/20

Primary Examiner—Charles A. Marmor
Assistant Examiner—Richard M. Camby
Attorney, Agent, or Firm—Wood, Dalton, Phillips, Mason & Rowe

[57] ABSTRACT

A self-propelled implement carrier is provided with a main frame defining a longitudinal axis. A power plant is mounted on the main frame at one side of the longitudinal axis, thereby leaving a space for carrying an implement at a location which is coincident with the longitudinal axis. Spaced driven wheels are journalled on a drive axle projecting from the power plant across the longitudinal axis. Spaced steering wheels are journalled on a steering axle longitudinally spaced from the drive axle and projecting from the drive means across the longitudinal axis. An operator's cab is supported on the main frame generally on the longitudinal axis, laterally offset from the power plant.

17 Claims, 4 Drawing Sheets

SELF-PROPELLED IMPLEMENT CARRIER

BACKGROUND OF THE INVENTION AND THE PRIOR ART

This invention relates to a self-propelled implement carrier and, particularly, to such a carrier for mounting any one of a plurality of agricultural implements of varying functions on a common main frame having a power plant or drive means.

One type of implement carrier of the character described is shown in U.S. Pat. No. 3,425,194 to Stott et al, dated Feb. 4, 1969. The Stott patent discloses a self-propelled power plant assembly which mounts a power plant or drive means at one side of a longitudinal axis of the implement carrier. The assembly has a front driven axle and a rear steering axle, the wheels on the driven axle having a substantially wider wheel base than the wheels on the steering axle. An operator's cab is located on the assembly at the same side of the longitudinal axis as the power plant. A free area thereby is located along the longitudinal axis, at one side of the power plant and the operator's cab, for mounting various agricultural implements.

Self-propelled power plant assemblies as shown in the Stott patent have stability problems due, in part, to the combination of the different wheel bases and the side location of the operator's cab. Such implement carriers also create problems with uneven soil compaction.

There is a need to provide a more stable and balanced implement carrier of the character described, and this invention is directed to satisfying that need and solving the aforesaid problems.

SUMMARY OF THE INVENTION

An object, therefore, of the invention is to provide a new and improved self-propelled implement carrier particularly adaptable for use with a variety of agricultural implements.

In the exemplary embodiment of the invention, the implement carrier includes a main frame defining a longitudinal axis. A power plant or drive means is mounted on the main frame at one side of the longitudinal axis. Spaced driven wheels are journalled on a drive axle projecting from the drive means across the longitudinal axis at one end of the main frame. Spaced steering wheels are journalled on a steering axle longitudinally spaced from the drive axle and projecting from the drive means across the longitudinal axis at the other end of the main frame. An operator's cab is supported on the main frame generally on the longitudinal axis laterally offset from the drive means. This combination provides a space for carrying an implement at a location which is coincident with the longitudinal axis and generally in line with the operator's cab.

The driven wheels and the steering wheels have substantially the same wheel base, and the drive axle and steering axle are provided with a telescoping construction to provide for lateral adjustment of the wheel base.

The operator's cab is mounted on a cross arm extending transversely from the drive means, and the cab is mounted for pivoting of approximately 180 degrees about a vertical axis. The cross arm supports the cab in an elevated location to define an extension of the longitudinal space, beneath the cab, within which various agricultural implements are carried.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

DETAILED DESCRIPTION OF THE PREFERRED EMBODIMENT

Figure 1:
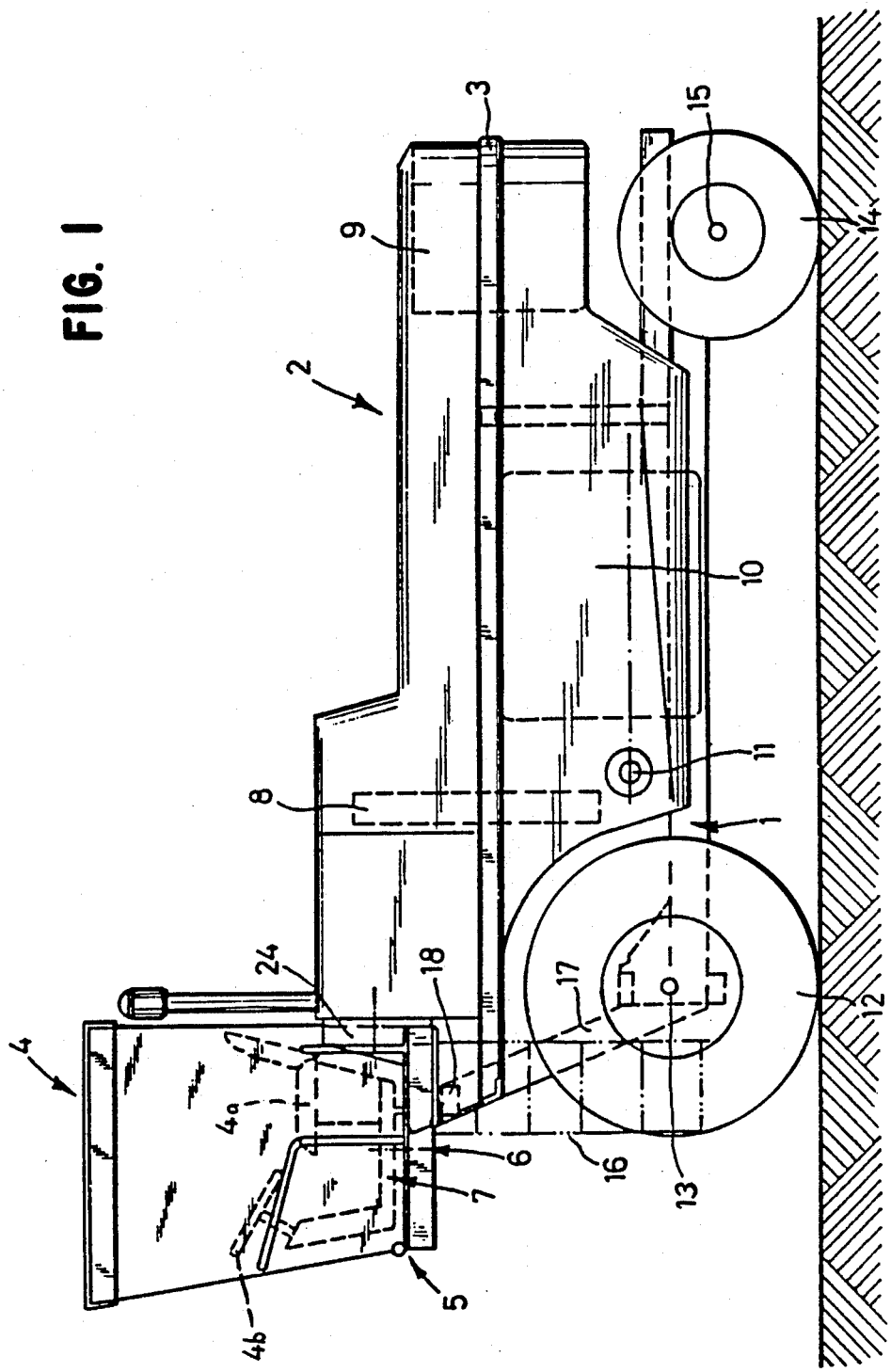
FIG. 1 is a side elevational view of the self-propelled implement carrier of the invention.

Referring to the drawings in greater detail, and first to FIG. 1, a main frame, generally designated 1, is provided for mounting a power plant or drive means, generally designated 2. A secondary frame 3 is located above main frame 1.

An operator's cab, generally designated 4, includes a driver's seat 4a, a steering wheel 4b and various controls (not shown) for driving and operating the implement carrier. The entire operator's cab assembly, generally designated 7, can be pivoted about a vertical axis, generally designated 6, approximately 180 degrees so that the implement carrier can be operated by the driver in opposite directions with the driver facing in either direction. The cab enclosure is pivotable upwardly about a horizontal axis, generally designated 5.

A radiator 8, a fuel tank 9, a motor 10 and an auxiliary power take-off 11 are mounted either on main frame 1 or secondary frame 3.

A pair of spaced drive wheels 12 and a pair of spaced steering wheels 14 are provided at the ends 13 and 15, respectively, of a drive axle and a steering axle which are better shown in FIG. 2, as described hereinafter.

A ladder 16 is provided for an operator to ascend to cab 4. An angled frame member 17 extends upwardly from main frame 1 and is connected to a horizontal cross bar 18 extending laterally beneath and supporting cab 4.

Figure 2:
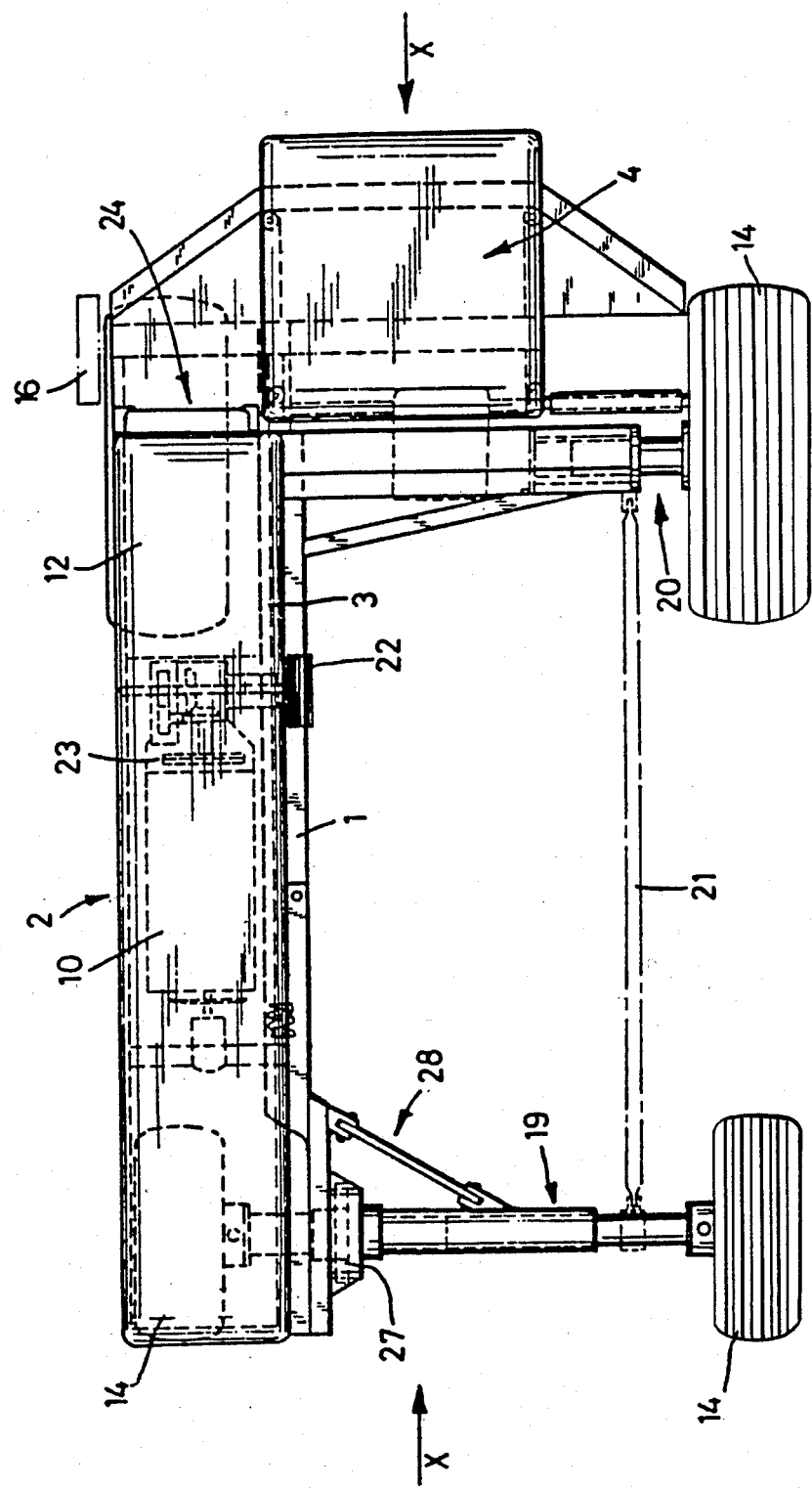
FIG. 2 is a top plan view of the implement carrier.

FIG. 2 shows that steering wheels 14 are journalled at opposite ends of a steering axle, generally designated 19, projecting from drive means 2 across a longitudinal axis of the implement carrier defined by arrows "X". Driven wheels 12 are journalled at opposite ends of a drive axle, generally designated 20, projecting from drive means 2 across longitudinal axis "X—X". A removable stabilizer bar 21 (shown in phantom) extends between the outboard ends of steering axle 19 and drive axle 20. Both axles are fabricated with a telescoping construction to adjust the wheel base of the implement carrier. It can be seen that although driven wheels 12 are of larger sizes than steering wheels 14, both sets of wheels are maintained at the same wheel base.

An angular hitch, generally designated 28, interconnects steering axle 19 and main frame 1. The main frame is offset, as at 29, to accommodate the turning radius of the steering wheel 14 which is located beneath drive means 2.

FIG. 2 also shows a belt drive 22 and a clutch 23 operatively associated with motor 10, along with auxiliary power take-off 11 (FIG. 1). Air intake means 24 are located on drive means 2 at one side of cab 4. The air intake means is equipped with a conventional rotor screen and is provided for cooling the power plant system.

Figure 3:
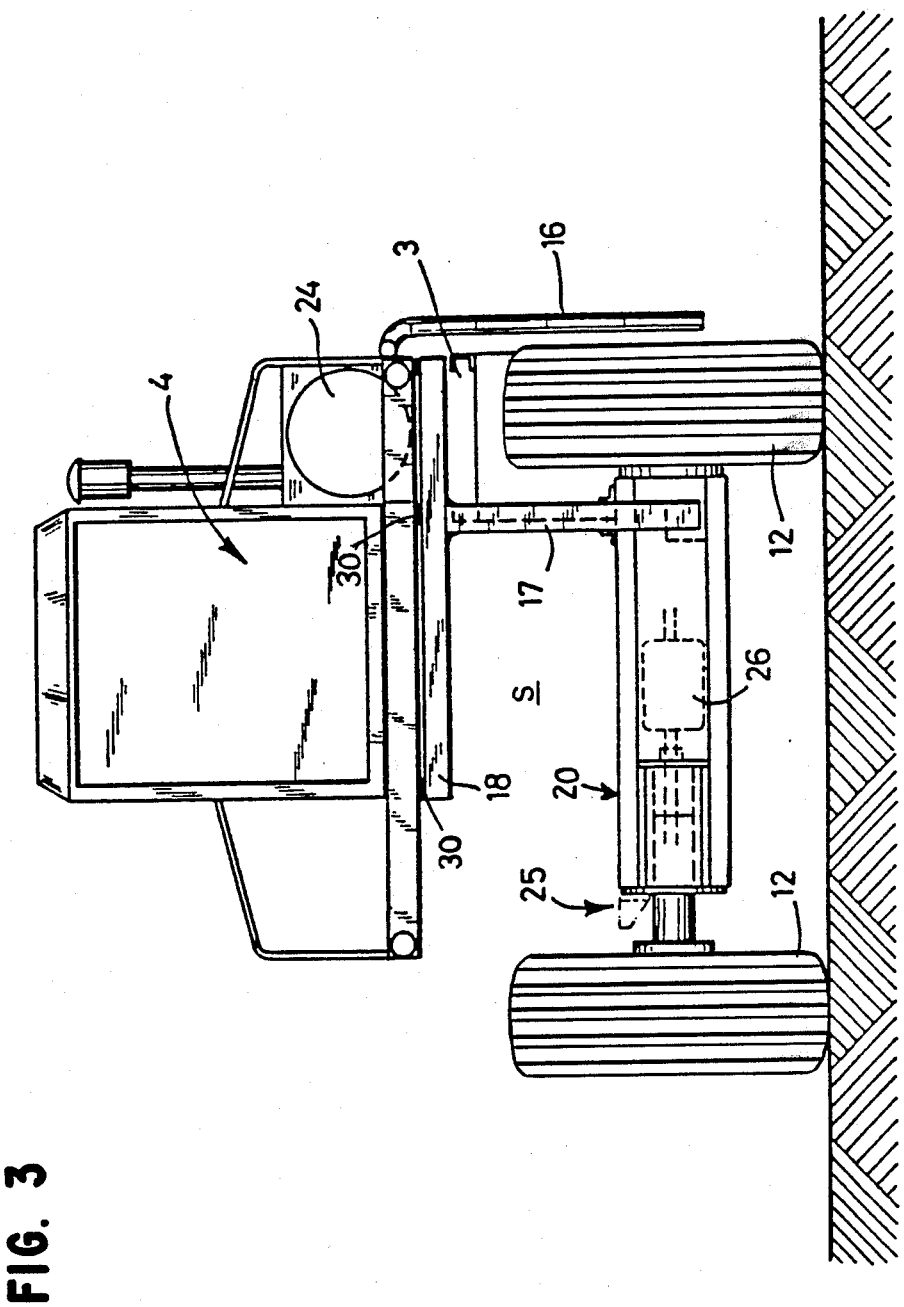
FIG. 3 is a rear elevational view of the implement carrier.

FIG. 3 shows that additional frame components, shown in phantom and generally designated 25, can be employed for extending the frame construction of the implement carrier. A gear case 26 is provided for drive axle 20.

Figure 4:
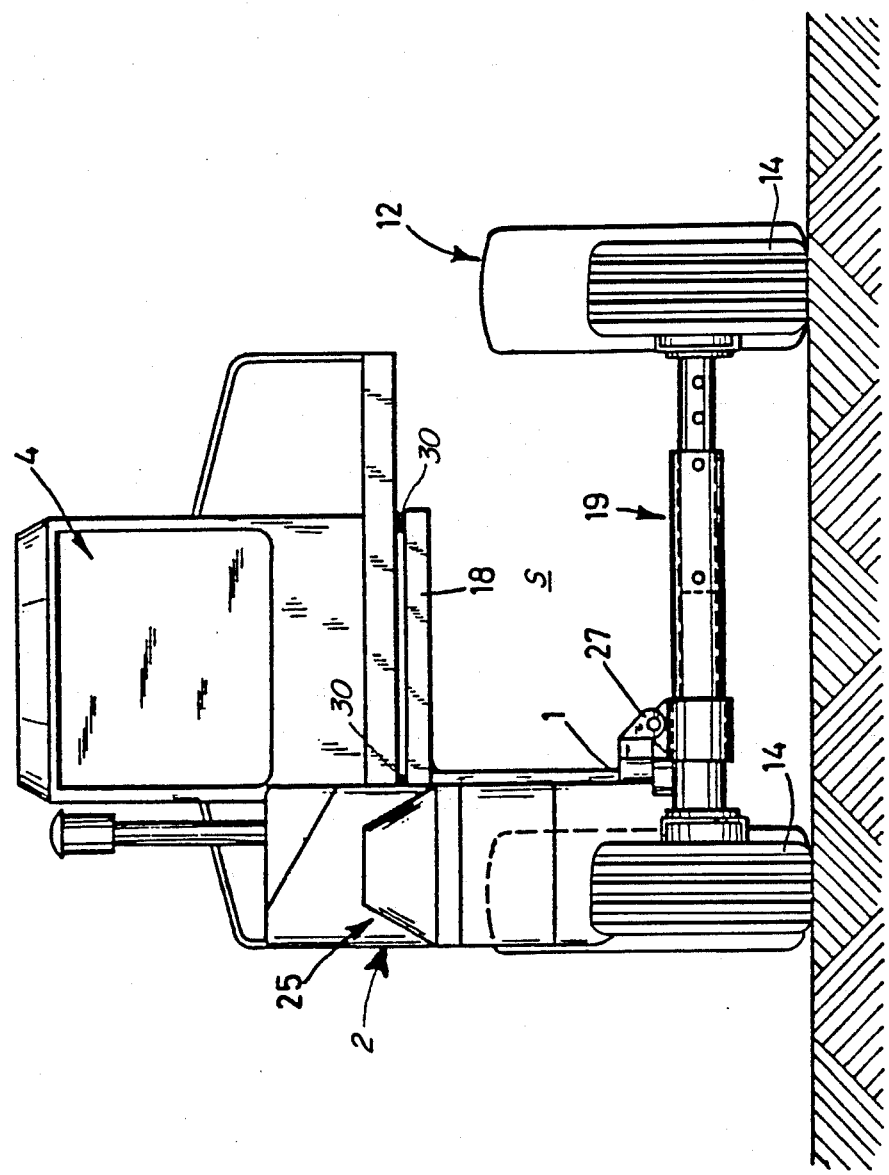
FIG. 4 is a front elevational view of the implement carrier.

FIG. 4 shows a motor hood 25 in the upper area of drive means 2. A horizontal pivot 27 is located adjacent main frame 1 to support steering axle 19.

The operator's cab is supported on cross arm 18 by resilient pads 30 (FIGS. 3 and 4). Fuel tank 9 and motor 10 (FIG. 1) are separated to provide space for the installation of necessary hydraulic drive elements. Belt drive 22 (FIG. 2) for various implements is located on the inside of drive means 2, while auxiliary power take-off 11 is located on the outside of the drive means.

From the foregoing, particularly with reference to FIGS. 3 and 4, it can be seen that the operator's cab 4 not only is located coincident with the longitudinal axis of the implement carrier for stability purposes, but the cab is elevated on cross arm 18 above a space "S" which is free and usable to install a variety of agricultural implements. Furthermore, working control of the implement carrier is made easier by the location of the cab.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

I claim:

1. A self-propelled implement carrier, comprising:
   a main frame defining a central longitudinal axis and an open space generally centrally of the carrier;
   wheels journalled on axle means at opposite ends of the main frame and spaced on opposite sides of the longitudinal axis, at least the spaced wheels at one end of the frame being driven;
   drive means operatively associated with the driven wheels and mounted on the main frame to one side of the longitudinal axis and said open space; and
   an operator's cab supported above the main frame generally on the longitudinal axis laterally offset from the drive means and cantilevered therefrom generally perpendicularly of the longitudinal axis whereby the cab extends inwardly above said main frame to leave said open space beneath the cab and above the main frame.

2. The self-propelled implement carrier of claim 1 wherein the wheels at opposite ends of the main frame have substantially the same wheel base.

3. The self-propelled implement carrier of claims 1 or 2 wherein the wheels are mounted on transverse axles, and at least one of the wheels on the side of the longitudinal axis opposite the drive means is adjustable axially of its axle.

4. The self-propelled implement carrier of claim 3 wherein the axle of said at least one wheel is of a telescoping construction to provide said adjustment.

5. The self-propelled implement carrier of claim 1 wherein the operator's cab is mounted on a cross arm extending transversely from the drive means.

6. The self-propelled implement carrier of claim 1, including means mounting the operator's cab for pivoting of approximately 180 degrees about a vertical axis.

7. The self-propelled implement carrier of claim 1 wherein the drive means include air intake means located on one side of the operator's cab.

8. The self-propelled implement carrier of claim 1 wherein the main frame includes a lower frame for carrying the drive means and an implement alongside the drive means, and an upper frame for supporting the operator's cab above the main frame.

9. The self-propelled implement carrier of claim 8 wherein the operator's cab is mounted on a cross arm supported by means extending between the upper and lower frames.

10. The self-propelled implement carrier of claim 1 wherein the spaced wheels at the opposite end of the main frame are journalled on a steering axle pivotable about vertical pivot means alongside the drive means.

11. The self-propelled implement carrier of claim 10, including a diagonal hitch extending between the steering axle and the main frame for pivoting the steering axle about said pivot means.

12. The self-propelled implement carrier of claim 10 wherein the driven wheels are journalled on a rigid axle, and including a removable reinforcing bar extending between the rigid axle and the steering axle on the side of the longitudinal axis opposite the drive means.

13. A self-propelled implement carrier, comprising:
   a main frame defining a central longitudinal axis and an open space generally centrally of the carrier;
   drive means mounted on the main frame at one side of the longitudinal axis, thereby leaving said space for carrying an implement at a location which is coincident with the longitudinal axis;
   wheels at opposite ends of the main frame and spaced on opposite sides of the longitudinal axis by means of axles mounted on the main frame and projecting from the drive means, at least the spaced wheels at one end of the main frame being driven; and
   an operator's cab supported above the main frame generally on the longitudinal axis laterally offset from the drive means and cantilevered above the main frame generally perpendicularly of a vertical plane including the longitudinal axis whereby the cab extends inwardly in an elevated location above the main frame to define an extension of said space beneath the cab.

14. The self-propelled implement carrier of claim 13 wherein the wheels are mounted on transverse axles, and at least one of the wheels on the side of the longitudinal axis opposite the drive means is adjustable axially of its axle.

15. The self-propelled implement carrier of claim 14 wherein the axle of said at least one wheel is of a telescoping construction to provide said adjustment.

16. The self-propelling implement carrier of claims 13, including means mounting the operator's cab for pivoting of approximately 180 degrees about a vertical axis.

17. The self-propelled implement carrier of claim 13 wherein the driven wheels are journalled on a rigid axle, and including a removable reinforcing bar extending between the rigid axle and the steering axle on the side of the longitudinal axis opposite the drive means.

* * * * *